United States Patent [19]

Dagdeviren et al.

[11] Patent Number: 5,371,534
[45] Date of Patent: Dec. 6, 1994

[54] ISDN-BASED SYSTEM FOR MAKING A VIDEO CALL

[75] Inventors: Nuri R. Dagdeviren, Red Bank; Khashayar Mohammadi, Middletown; Andreas C. Papanicolaou, Lincroft, all of N.J.

[73] Assignee: AT&T Corp., Murray Hill, N.J.

[21] Appl. No.: 919,000

[22] Filed: Jul. 23, 1992

[51] Int. Cl.$^5$ .................... H04N 7/14; H04M 11/00
[52] U.S. Cl. ........................................ 348/14; 348/16; 348/17; 379/94
[58] Field of Search ............... 379/53, 54, 93, 94, 379/355; 358/85; 370/54, 62, 110.1; H04N 7/14, 7/12

[56] References Cited

U.S. PATENT DOCUMENTS

| 5,101,427 | 3/1992 | Kotani et al. | 379/355 |
| 5,184,345 | 2/1993 | Sahi | 358/85 |

FOREIGN PATENT DOCUMENTS

| 0007752 | 1/1990 | Japan | 379/53 |
| 0205953 | 9/1991 | Japan | 379/53 |
| 3205953 | 9/1991 | Japan | 348/14 |

OTHER PUBLICATIONS

"The 5ESS Switching System" *AT&T Technical Journal*, vol. 64, No. 6, part 2, pp. 1305–1564, Jul./Aug., 1985.

"No. 4 ESS". Bell System Technical Journal (BSTJ) vol. 56, No. 7, pp. 1015–1320, Sep., 1977.

"Recommendations of the H–Series" *International Telegraph and Telephone Consultative Committee (CCITT)* Study Group XV—Report R 37, Geneva Mtg. 16–27 Jul. 1990.

ISDN Q.931 Fallback negotiation standards, pp. 73–77, Mar., 1992.

*Primary Examiner*—Curtis Kuntz
*Assistant Examiner*—Jason Chan
*Attorney, Agent, or Firm*—Ronald D. Slusky

[57] ABSTRACT

A single medium (audio) voice grade call initiated by an ISDN video phone and directed to another ISDN video phone is converted into a multimedia (audio and video) ISDN call by a) maintaining the connection for the voice grade call while the ISDN audio and video connection is being established over a bearer channel of the ISDN subscriber loop different from the bearer channel being used by the voice grade connection, b) switching the audio signals from the voice grade call to the ISDN audio and video connection, once the ISDN audio and video connection is established, and c) tearing down the initial voice grade call.

15 Claims, 4 Drawing Sheets

ISDN-BASED SYSTEM FOR MAKING A VIDEO CALL

TECHNICAL FIELD

This invention relates to Integrated Services Digital Network (ISDN) video telephony and, more specifically, to a method and system for making a video call by gracefully transitioning from a one-medium (audio) call completed over voice grade facilities to a multi-media (audio and video) call completed over clear data trunks.

BACKGROUND OF THE INVENTION

The emergence of video phones in the marketplace, coupled with the adoption and increasing implementation of Narrowband Integrated Services Digital Network (N-ISDN) standards, has brought to the attention of network and video telephony designers certain practical communications compatibility issues associated with the integration and co-existence of N-ISDN video telephony with "standard" telephony, also called Plain Old Telephone Service (POTS). As is well known, one N-ISDN standard is the Basic Rate Interface (BRI), which defines operating parameters for the transmission and reception of mixed medium digital information over a digital subscriber loop. For the basic rate interface, the loop is logically partitioned into two bearer (B) channels and one data (D) channel, commonly known as a 2B+D interface.

One of the major N-ISDN/POTS compatibility issues relates to the diverse types of calls that a caller using a multi-media terminal device can initiate to a called party whose subscriber loop characteristics and terminal device media support capabilities are unknown. For example, when a caller using an ISDN-compliant video phone wants to communicate with a called party whose access line arrangement and terminal device media support capabilities are unknown, the caller typically initiates an audio call using one of the BRI bearer channels as a voice grade communication path, since the caller is unable to ascertain whether the called party has a POTS line connected to an analog telephone set or an ISDN BRI subscriber loop connected to an ISDN-compliant video phone. In an ISDN environment, an audio call is initiated by an end-user device, such as a video phone requesting speech bearer service from the network. Similarly, a clear data call is established by an end user device, such as a video phone requesting unrestricted 64 Kbps bearer service from the network. The initiation of a voice grade call also stems from the caller's awareness that a clear data call to the called party will not be completed if the called party does not have an ISDN BRI subscriber loop.

If, in the course of their conversation, calling and called parties find out that they are both using the audio capabilities of ISDN-compliant video phones, it is likely that they might wish to switch to a multi-media (audio/video) call instead of the single medium (audio only) call. In that case, it would be desirable for the call to be transitioned gracefully from an audio only call to an audio and video call, without any loss of audio communication between the parties while the video call is being set up.

The ISDN standards developers anticipated this compatibility issue and accordingly, drafted CCITT Q.931 fallback negotiation standards specifications, also called "bearer capability selection standards", as a network-based solution to that problem. These standards include provisions for a call setup message to carry signaling information specifying, for example, a preferred medium and an alternate medium for a call. Thus, in an ISDN Q.931 fallback negotiation standard compliant networking environment, a video phone caller initiating a call to a party whose terminal capabilities are unknown would request an end-to-end clear data channel (for a video/audio call) as the preferred communication path, with an option for "fallback" to a voice grade channel as a communication path of last resort. The latter option is exercised when either the communication network connecting calling and called parties is unable to provide a clear end-to-end data channel connection, or the called party has a non-ISDN telephone set connected to a POTS line.

Since the Q.931 fallback negotiation standards involve appropriate circuit selection and other decisions by the originating, intermediate and terminating switches, these standards must be implemented in all of the switches within the communication path of a call in order to allow a communication network to reserve an application and medium independent transport mechanism for a clear data channel call. In that case, the terminal adapters or the terminal devices negotiate the speed, protocols, medium or application for the call. However, due to the high implementation costs associated with the Q.931 fallback negotiation standards, communications carriers have been reluctant to implement these standards in the switches deployed in their networks. With no clear sign on the horizon pointing to a speedy and widespread implementation of these standards, an alternate solution for gracefully transitioning a voice grade audio call to an ISDN audio and video call is needed.

Another attempt to provide a graceful transition from a one-medium call to a multimedia call involves the use of the premises-based H.221 ISDN standard, which includes specifications for dynamic reconfiguration of bandwidth allocation for different media within one ISDN bearer channel. More specifically, the H.221 ISDN standard offers capabilities to handle speed negotiation for each medium and handshake communications protocols between terminal devices before an end-to-end connection is transitioned from a one-medium call to a multimedia call. The H.221 standard offers an adequate solution for ISDN calls originating and terminating on video phones connected to the same ISDN switch, since the switch does not have to make a facilities selection decision to complete the call. Unfortunately, one of the limitations of the H.221 standard is that it represents a viable solution only for calls either purposely initiated over clear data channels or for calls that happen to use clear data connections by virtue of the fact that the originating and terminating video phones are connected to the same ISDN switch. Thus, a graceful transition from a one-medium call to a multi-media call is still an unresolved problem in a mixed ISDN and POTS communication network.

SUMMARY OF THE INVENTION

In accordance with the invention, an ISDN audio and video call is made between two video phones a) by first completing an initial audio call carried over a communication path consisting of one of the logical channels of the digital loop of each video phone and the voice grade trunks interconnecting the switches serving those video phones, b) by gracefully transitioning from the initial audio call to an ISDN audio and video call using a different logical channel for each video phone and clear data trunks connecting the switches, and c) by tearing down the initial audio call after the transition has been completed. During the transition, the communication path for the initial audio call is maintained while the separate clear data connection for the ISDN audio and video call is being established.

The separate clear data connection is set up between the two video phones through exchange of handshake communication protocol signals and synchronization parameters between the video phones. After audio signals are transmitted by each video phone to the other via the clear data connection, the audio communication from the initial communication path is switched to the clear data connection. Then, the initial communication path is torn down.

In a preferred embodiment of the invention, while the initial audio call is maintained active, the ISDN audio and video call is initiated by a first video phone directing its serving switch to establish a clear data connection to a second video phone. Directions to the serving switch are contained in call setup messages transmitted via the signaling channel of the digital loop along with the telephone number associated with the second video phone. The call setup message is routed to the second video phone via the signaling network of the communication switching system connecting the two video phones. The second video phone returns a "connect" message to the first video phone to indicate that an end-to-end clear data connection is reserved for the ISDN audio and video call. Upon receiving the connect message, the first video phone generates and inserts framing control signals, such as H.221 frame alignment bits, in the available bearer channel and transmits those signals to the second video phone via the reserved clear data connection. The second video phone detects the framing control signals and returns a code to the first video phone to indicate that synchronization between the two video phones has been achieved. The two video phones negotiate bandwidth allocation for audio and video signals and then are ready to transmit to each other digital bit streams that make up the audio and video call via the reserved clear data connection. Upon reception by each video phone of the digital bit streams transmitted by the other video phone, the audio communication signals carried over the initial communication path are switched by the video phones from the initial communication path to the clear data connection. Then, the communication path that carded the initial audio call via the voice grade facilities is tom down by one of the video phones.

If the ISDN video phones have enhanced video capabilities, (meaning that they can use two bearer channels for ISDN audio and video calls) the audio and video call can be further transitioned gracefully from a one-bearer channel video call to a two-bearer channel call. Taking advantage of well-known prior art techniques, such as H.221 ISDN standards, the bearer channel freed by the termination of the voice grade call is reused as the second channel for the enhanced video call.

DETAILED DESCRIPTION

Figure 1:
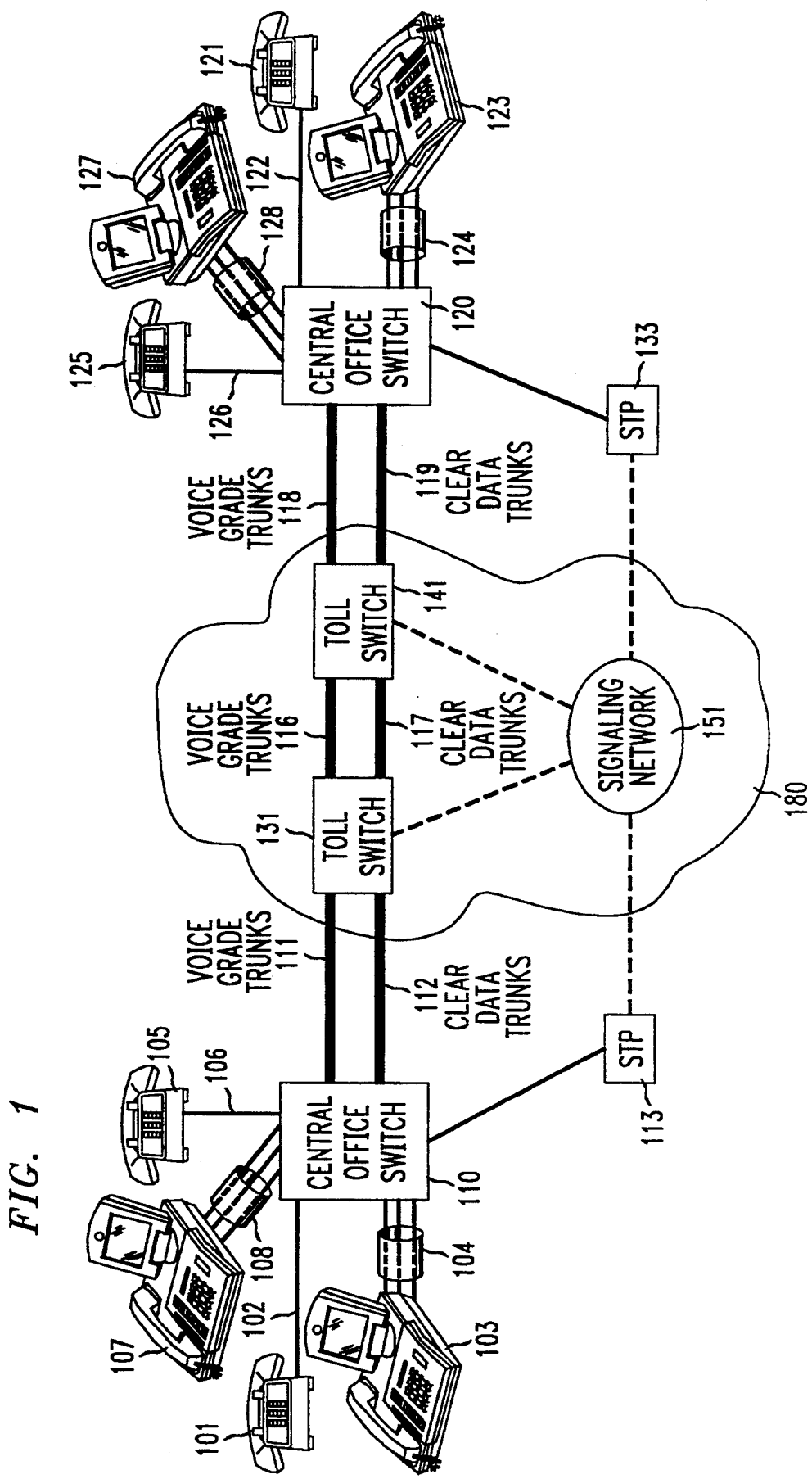
FIG. 1 is a block diagram of a communication switching system arranged to route ISDN audio and video communication traffic over clear data facilities and POTS audio communication traffic over voice grade facilities.

FIG. 1 is a block diagram of a communication switching system arranged to route ISDN multimedia communications traffic over clear data facilities and single medium POTS audio communication traffic over voice grade facilities. Shown in FIG. 1 are two types of end user devices, namely a) analog devices, such as telephone sets 101, 105, 121 and 125 which receive and transmit analog voice traffic over voice grade facilities, and b) ISDN compliant devices, such as video phones 103, 107, 123 and 127 which can receive and transmit digitized voice and video traffic over clear data facilities. ISDN video phones are currently available from various sources, such as OKI, Mitsubishi Electronics and NEC. Those video phones can be used with appropriate modifications (described below) to implement our invention. Video phones 103, 107, 123 and 127 transmit and receive audio, video and supervisory signals over subscriber digital loops 104, 108, 124 and 128 respectively, each of which complies with the ISDN Basic Rate Interface (BRI) standards. Digital loops 104, 108, 124 and 128 are connected to central office switches 110 and 120 which are processor-controlled, software-driven communication switching systems arranged to switch POTS and ISDN traffic and to establish clear data communication paths for calls initiated by ISDN devices such as video phones 103, 107, 123 and 127. Central office switches 110 and 120 may be implemented using the AT&T No. 5ESS® switch, whose features and functionality are described in *AT&T Technical Journal*, Vol. 64, No. 6, part 2, pp. 1305–1564, July/August, 1985.

Central office switches 110 and 120 select facilities to route calls destined for devices connected to other central office switches. The type of facilities selected by central office switches 110 and 120 is predicated on the type of calls initiated by the caller and the type of access arrangement serving the device being used by the caller. For example, voice grade calls initiated by ISDN or non-ISDN devices are automatically routed over voice grade trunks 111 or 118 to interexchange carrier 180 by central office switches 110 and 120, respectively. Similarly, central office switches 110 and 120 route clear data calls initiated by ISDN devices over clear data trunks 112 and 119, respectively. Voice grade trunk group 116 is arranged to carry primarily voice traffic and as such, may be equipped with permanent echo cancelers placed at strategic points on that trunk group to compensate for echo impairment in the audio signals transmitted via channels in the trunk group. Clear data trunk group 117, by contrast, may not have any echo cancelers or may be equipped with controllable echo cancelers. It is to be understood that a call initiated by video phone 123, for example, and destined for video phone 127, which is connected to the same switch, can be gracefully transitioned from an audio only call to an audio and video call using the techniques of the prior art, since each central office, such as central office 120, is arranged to route all calls between end user devices connected to the same switch over clear data channels. The same principle would be true for calls initiated from video phone 103, destined for video phone 107 and routed by central office switch 110.

Voice grade trunk groups 111 and 118 and clear data trunk groups 112 and 119 connect central office switches 110 and 120 to toll switches 131 and 141 (respectively) which are themselves interconnected within interexchange carrier network 180 by trunk groups 116 and 117. Interexchange carrier network 180 is a communication switching system which is comprised of toll switches, such as toll switch 131 and 141, transmission facilities, such as trunk group 116 and 117 and a signaling network, such as signaling network 151, and which is arranged to route long distance calls to central office switches, such as central office switches 110 and 120. Toll switches 131 and 141 are programmable communication switching systems that operate as points of access and egress for all traffic to be switched on interexchange carrier network 180. Toll switches 131 or 141 may be implemented using the AT&T No. 4ESS® whose architecture and capabilities are explained in great detail in *Bell System Technical Journal* (BSTJ), Vol. 56, No. 7, pp. 1015–1320, September, 1977.

Toll switches 131 and 141 exchange call handling messages via signaling network 151, which is a packet switching network comprised of a plurality of interconnected nodes called Signal Transfer Points (STPs), which exchange call processing messages according to a specific protocol, such as CCITT common channel interoffice signaling number 7, called "SS7" for short. The protocol used by signaling network 151 for call processing messages is different from the Q.931 protocol used for ISDN call processing messages. Accordingly, switches 110 and 120 map Q.931 messages into SS7 messages before forwarding them to signaling network 151. Similarly, switches 110 and 120 map SS7 messages received from signaling network 151 into ISDN Q.931 messages before transmitting them to video phones 103, 107, 123 and 127. Signaling network 151 is also connected to STPs 113 and 133 serving central office switches 110 and 120 respectively. The interconnection of an interexchange carrier signaling network with an STP serving a central office switch is sometimes called "Common Channel Signaling Network Interconnect" (CCS-NI).

Figure 2:
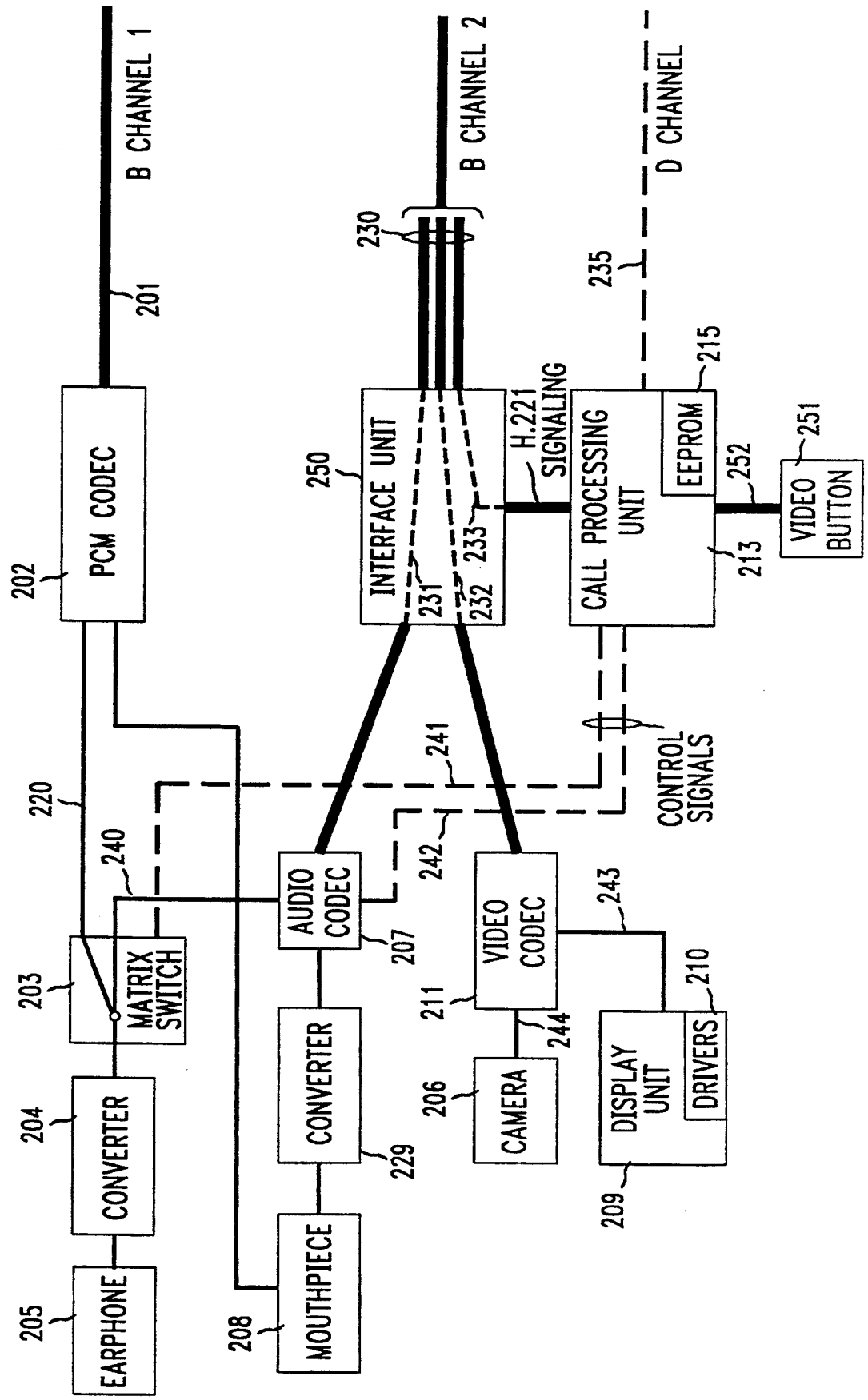
FIG. 2 is a block diagram of a controller for an ISDN video phone embodying the principles of this invention.

FIG. 2 is a block diagram of an ISDN video phone arranged to switch audio signals in accordance with the invention, from a voice grade channel to a clear data channel after synchronization with another ISDN video phone has been achieved. In FIG. 2, audio signals for the established voice grade call are transmitted and received over voice grade bearer (B) connection 201, which is one of the logical channels within subscriber loop 104, 108, 128 or 124 of FIG. 1. The received signals are converted into a digital Pulse Code Modulation (PCM) bit stream in codec 202 and forwarded via line 220 to matrix switch 203. The latter is arranged to connect either line 220 or 240 to converter 204 upon receiving appropriate instructions from call processing unit 213 (described below). Incoming digital signals from line 220 or 240 are transformed into analog electrical audio signals by converter 204 and forwarded by the latter to ear phone 205.

Figure 4:
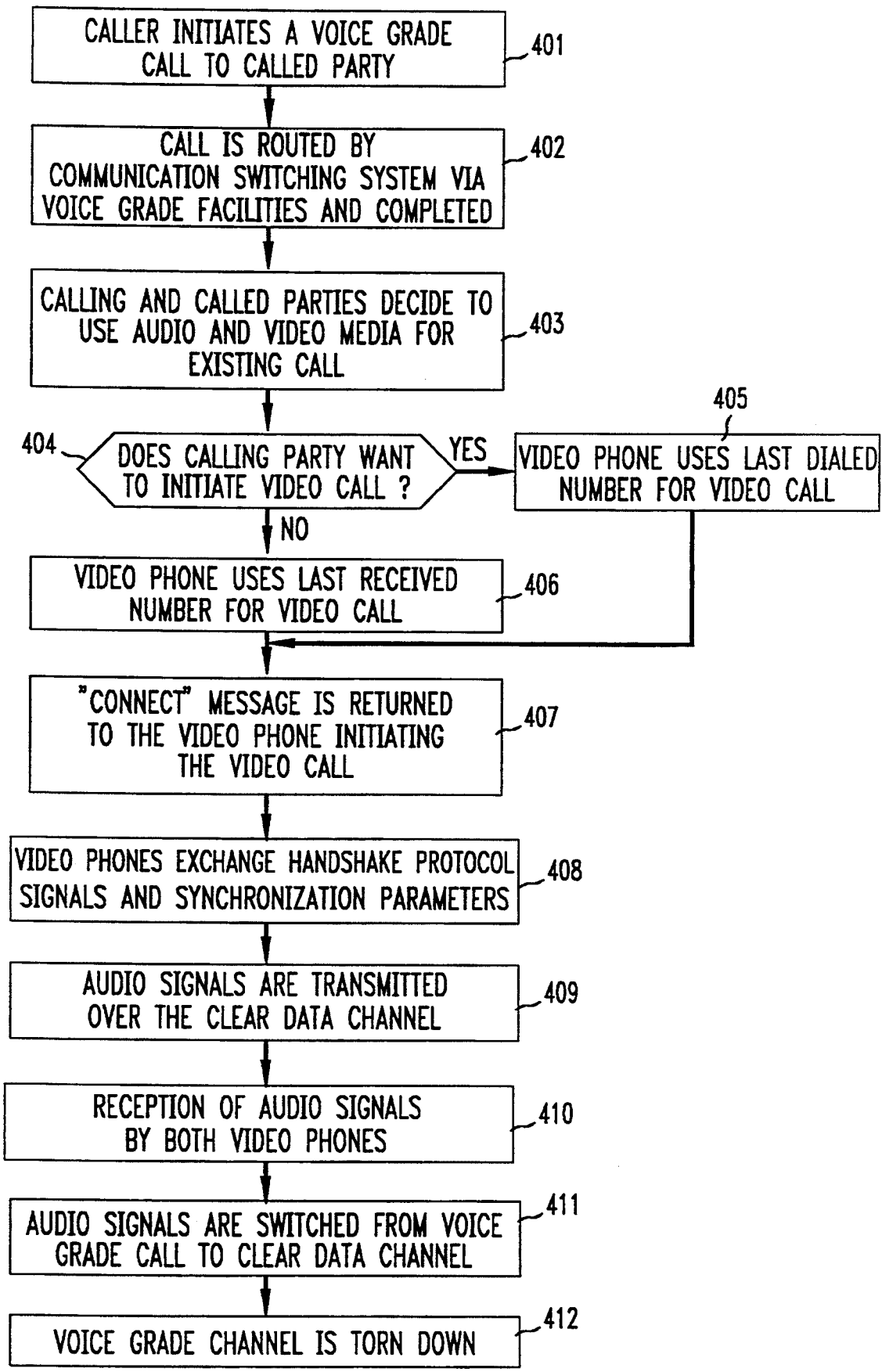
FIG. 4 presents, in flow diagram format, actions taken and decisions formulated by the ISDN video phones and different components of a communication switching system to implement this invention.

Call processing unit 213 is a processor, which executes programming instructions stored in Electrically Erasable Programmable Read Only Memory EEPROM) 215, including the instructions described in FIG. 4. In addition, EEPROM 215 stores the last number dialed on the video phone and the number for the last call received by the video phone. Illustratively, the activation of video button 251 to initiate a video call causes a signal to be sent to call processing unit 213 via line 252. That signal triggers the retrieval of either the last dialed number or the last received number depending on whether the video phone of FIG. 2 is operated by the party who initiated the voice grade call or the party who received the voice grade call. Call processing unit 213 generates a call setup message that is transmitted along with the last dialed number or the last received number to the serving central office switch via D (signaling) channel 235 of the basic rate interface. Signaling channel 235 is one of the logical channels within subscriber loop 104, 108, 128 or 124 of FIG. 1. A connect message is returned to call processing unit 213 via the same channel. From that point on, all handshake protocol signals (H. 221 signaling information described below) exchanged between the two video phones are transmitted and received via subchannel 233 of bearer channel 230, which is one of the logical channels within subscriber loop 104, 108, 128 or 124 of FIG. 1. When call processing unit 213 receives a call setup message and a calling party number from another video phone and determines that a voice grade call from the same source is still in progress on the other bearer channel of the digital loop, call processing unit 213 suppresses ringing for that call and automatically answers the call by sending a "connect" message to the video phone initiating the audio and video call. Call processing unit 213 receives synchronization and control signals from the other video phone and generates acknowledgement and other supervisory signals to initiate synchronization with the other video phone to indicate, for example, when handshake has been achieved with the other video phone. In addition, call processing unit 213 supervises and controls the operations of matrix switch 203 and audio codec 207. When handshake with the other video phone has been achieved, call processing unit 213 sends a signal to audio codec 207 indicating that the latter should start a) coding the audio signals received from mouthpiece 208 and transmitting those signals to interface unit 250, b) decoding audio signals received from interface unit 250 via link 231, and c) sending audio signals to matrix switch 203 over link 240. When call processing unit 213 receives a signal via H.221 signaling subchannel 233, indicating that the other video phone is also sending audio signals over the clear data connection, call processing unit 213 sends a signal to matrix switch 203 (via signaling bus 241 ) to disconnect line 220 and to connect line 240 to converter 204. Thus, call processing unit 213 controls the graceful transition of a call from a single medium (audio only) call to a multimedia (audio and video) call.

Call processing unit 213, audio codec 207 and video codec 211 receive their input from and transmit their output (via interface unit 250) to clear data channel 230. The latter is subdivided into three subchannels or virtual circuits, namely, subchannel or virtual circuit 231 for reception and transmission of audio signals, subchannel 232 for video signals and subchannel 233 for synchronization and control signals (H.221 ). It is to be understood that subchannels 231, 232 and 233 are not physical lines but rather logical data streams multiplexed over the physical communication path of the bearer channel of the basic rate interface using, for example, the CCITT H.221 recommendations for multiplexing scheme. The audio signals are forwarded to audio codec 207 for decoding and conversion into a digital stream which is sent by matrix switch 203 to converter 204 only upon instructions of call processing unit 213, as mentioned above. Similarly, audio codec 207 converts signals received from mouthpiece 208 (through converter 209) into digital bit streams that are transmitted in compressed format to the other video phone via subchannel 231 of the bearer channel 230. The output of mouthpiece 208 is also sent to PCM codec 202 which plays a similar role as codec 207 but uses different well known digital encoding techniques.

Interface unit 250 demultiplexes audio, video and H.221 synchronization signals received over B channel 230 and multiplexes a) video signals sent in compressed format by camera 206 (via video codec 211), b) audio signals also in compressed format by mouthpiece 208 (via audio codec 207), and c) synchronization (and control) signals by call processing unit 213 for transmission over B channel 230. Interface unit 250 can be implemented using a time slot interchanger and ISDN-BRI compliant physical line interface units.

Figure 3:
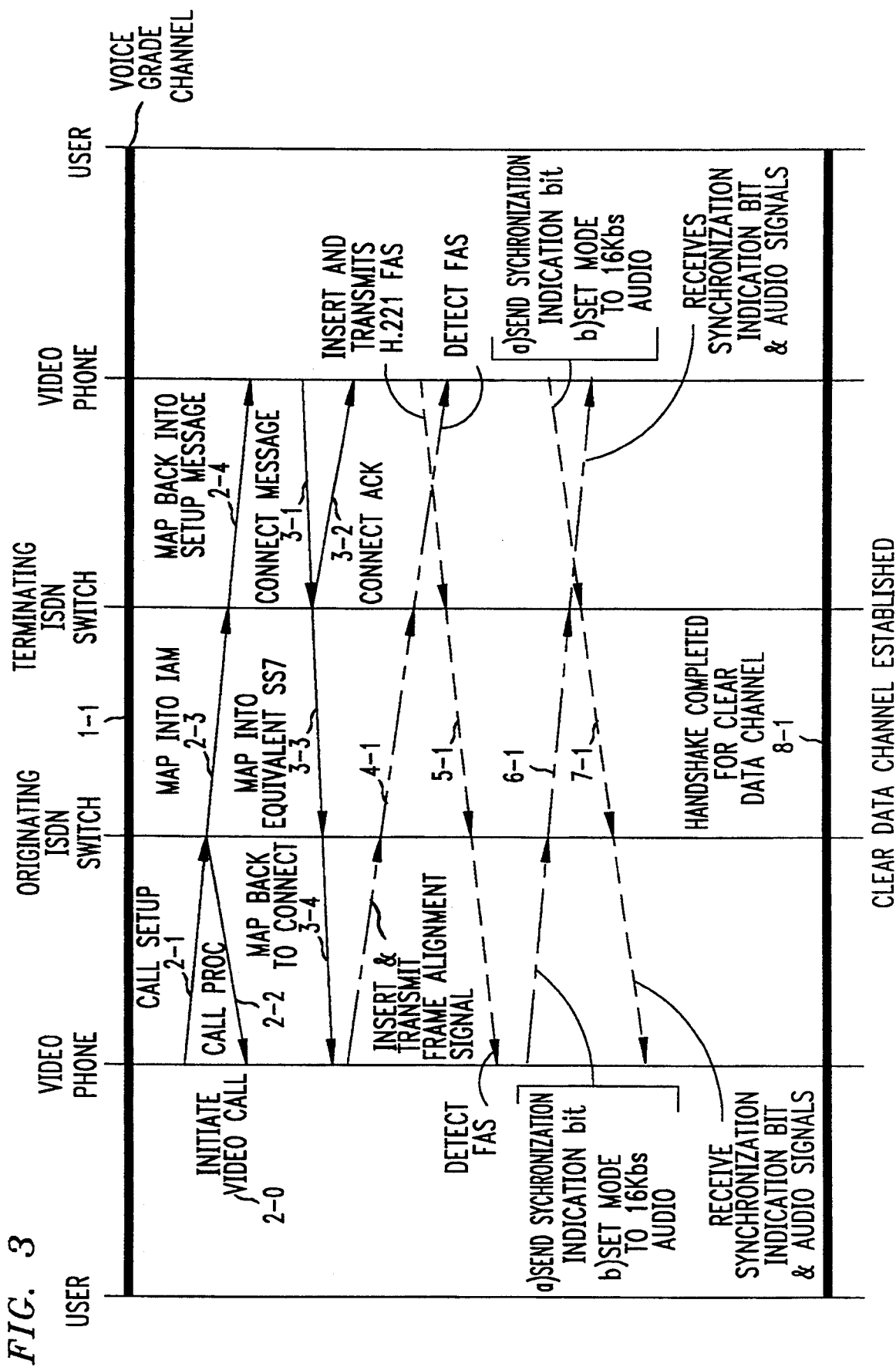
FIG. 3 shows a graphical representation of signals and call processing messages transmitted by ISDN video phones and different components of a communication switching system to allow a clear data channel to be established between the devices while a voice grade channel is still active.

FIG. 3 shows a graphical representation of signals and call processing messages transmitted by ISDN video phones and different components of a communication switching system of FIG. 1 to allow a clear data channel to be established between two video phones while a voice grade channel is still active. FIG. 3 is partitioned into a set of discrete events indicating either actions initiated by a specific component or triggered reaction to a preceding event. In event 1-1, for example, a communication path using a voice grade channel is established between two video phone users. In event 2-0, activation of the video button in one of the video phones initiates the audio and video call. In event 2-1, a call setup message is transmitted by the video phone to the ISDN switch (switch 110 or 120 of FIG. 1) serving the caller. In event 2-2, the switch returns a call processing message to the video phone initiating the call. The call processing message indicates to that video phone that the call setup message has been forwarded to signaling network 151. In event 2-3, the call setup message is mapped into an Initial Address Message (IAM) by the switch. The IAM message is transmitted via signaling network 151 and STP 113 or 133 of FIG. 1 to the terminating switch. In event 2-4, the terminating switch maps back the IAM message into a call setup message that is transmitted to the receiving video phone. In event 3-1, the receiving video phone transmits a "connect" message to the ISDN switch to which it is connected. In event 3-2, the terminating switch returns a message to the video phone acknowledging the reception of the "connect" message. The terminating switch in event 3-3 maps the "connect" message into an equivalent SS7 message that is transmitted via signaling network 151 of FIG. 1 and STP 133 or 113 to the originating switch (110 or 120 of FIG. 1). In event 3-4, the originating switch maps back the received SS7 message into a connect message that is transmitted via the signaling channel of the digital loop (104, for example) to the video phone which initiated the video call. Upon receiving the connect message, the initiating video phone uses call processing unit 213 of FIG. 2 to generate and transmit, in event 4-1 frame alignment signals to the other video phone. Similarly, the receiving video phone, upon receiving the connect acknowledgement message, in event 5-1 inserts and transmits H.221 frame alignment signals to the initiating video phone. The latter, upon detecting the frame alignment signals, in event 6-1, uses call processing unit 213 of FIG. 2 to transmit to the video phone which initiated the video call a) a synchronization indication bit, b) a signal indicating that the mode for audio signals has been set, for example to 16 Kbps and the mode for video signals has been set to 48 Kbps, and c) sixteen kilobits-coded audio signals that are inserted in H.221 frames. In event 7-1, similar information is transmitted by the receiving video phone upon detection of the H.221 frame alignment signals. In event 8-1, the handshake is completed for the clear data communication path and the audio signals are then switched from the voice grade channel to the clear data channel over which the video signals are also being transmitted. Subsequently, the voice grade connection is torn down. If the video phones are equipped for enhanced video, the video call is transitioned from a one-bearer channel call (64 kilobits per second) to a two-bearer channel (128 Kilobits per second) using the techniques of the prior art.

The process contemplated by this invention, and illustrated in flow diagram form in FIG. 4, is initiated in step 401, when a caller at video phone 103 of FIG. 1, for example, initiates a voice grade call to video phone 123. In step 402, the call is routed over voice grade facilities (111, 116, 121 ) and completed. In step 403, calling and called parties agree to use audio and video media for the existing call. In step 404, a determination is made as to who (calling or called party) is going to initiate the video call by depressing the video button of video phone 103 or 123. If the calling party initiates the video call, in step 405, video phone 103 automatically redials the called party telephone number (stored in EEPROM 215 of FIG. 2) and transmits the dialed number along with a call setup message to switch 110 via the signaling channel of digital loop 104. If the called party initiates the call, video phone 123, in step 406, dials the last received number (also stored in EEPROM 215) which is transmitted along with a call setup message to switch 120 via the signaling channel of digital loop 123. In step 407, a "call processing" message is returned to the video phone initiating the video call to indicate that the call is being set up. It is to be understood that while signaling messages and handshake protocol information are being exchanged between video phones 103 and 123 using the capabilities of a) switches 110 and 120, b) signaling network 151, and c) STPs 113 and 133, the calling and called parties continue their audio conversations unaffected by the call setup activities. In step 408, video phone 123 answers the call by returning a connect message to video phone 103. Video phones 103 and 123 exchange synchronization and handshake protocol signals, as described in FIG. 3. In step 409, video phones 103 and 104 generate and transmit to each other via the clear data channel (a channel in trunk groups 112, 117 and 119 of FIG. 1) digital signals that can be decoded by audio codec 207 of FIG. 2. In step 410, the signals received by the codec in each of the video phone are decoded. Thereafter, in step 411, the source of audio signals to the users is switched from the voice grade channel to the clear data channel. In step 412, the voice grade channel is torn down.

The above description is to be construed only as an illustrative embodiment of this invention. Persons skilled in the art can easily conceive of alternative arrangements providing similar functionality without any deviation from the fundamental principles or the scope of this invention.

We claim:

1. A method of completing an ISDN audio and video call comprising the steps of:

establishing an initial voice grade audio connection from a caller's ISDN video phone served by an ISDN subscriber loop having at least first and second logical bearer channels and a logical signaling channel, to a called party's end-user device, said connection being established through said first logical bearer channel of said loop.

in response to a signal indicating that said end-user device is an ISDN videophone, establishing an ISDN audio and video connection between said caller and said called party using said second logical bearer channel of said loop while said initial audio connection is still maintained active;

switching audio signals from said initial audio connection of said first logical bearer channel to said ISDN audio and video connection of said second logical bearer such that a graceful transition of said audio signals from said first logical bearer channel to said second logical bearer is achieved in a manner that is transparent to users; and tearing down said initial audio connection.

2. The method of claim 1, wherein said establishing step of said ISDN audio and video connection further includes the step of:

transmitting call setup messages by one ISDN video phone to the other ISDN video phone, wherein said call setup messages include information related to communication protocol, synchronization, and allocation of bandwidth for audio and video signals of said ISDN audio and video connection.

3. The method of claim 1 further comprising the steps of:

setting up a new ISDN audio and video connection that uses the bandwidth capacity freed by the tearing down of said first logical bearer channel of said initial audio connection; and multiplexing and demultiplexing enhanced audio and video signals over a multiconnection structure comprised of a) said ISDN audio and video connection of said second logical bearer channel, and b) said new ISDN audio and video connection which reuses said first logical bearer channel.

4. In a communication switching system designed to route POTS traffic and ISDN traffic, a method of converting a voice grade audio call between two parties having ISDN video phones, to an ISDN multimedia call connecting said ISDN video phones, each one served by an ISDN subscriber loop having a first logical bearer channel, a second logical bearer channel and a logical signaling channel, wherein said method comprises the steps of:

transmitting call setup messages via said signaling channel of said ISDN subscriber loop to establish said ISDN multimedia call over said second logical bearer channel while maintaining said voice grade call occupying said first logical bearer channel;

exchanging synchronization signals between said video phones via said second logical bearer channel of said subscriber loop to allocate bandwidth for the audio and video signals of said ISDN multimedia call;

switching audio signals from said first logical bearer channel to said second logical bearer channel for said ISDN multimedia call, such that a graceful transition from the voice grade audio call to the ISDN multimedia call is achieved in a manner that is transparent to users; and tearing down said voice grade call.

5. The method of claim 4, wherein said transmitting step further includes the step of activating in one of said video phones a mechanism that is linked to a processor included in said video phones having a memory arranged to store i) received telephone numbers of incoming calls, and ii) dialed telephone numbers of outgoing calls.

6. The invention of claim 5, wherein said activating step further includes the steps of:

retrieving from said memory the last received telephone number stored in said memory when said voice grade call was received by one of said video phones; and dialing said retrieved number.

7. The method of claim 5, wherein said activating of said mechanism step further includes the steps of retrieving from said memory the last dialed telephone number stored in said memory when said voice grade call was initiated by one of said video phones; and dialing said retrieved number.

8. A system of completing an ISDN audio and video call comprising means for establishing an initial audio connection from a caller's ISDN video phone served by an ISDN subscriber loop having at least first and second logical bearer channels and a logical signaling channel, to a called party's end-user device, said initial audio connection being established through said first logical bearer channel of said loop;

means responsive to a signal indicating that said end-user device is an ISDN videophone, for establishing an ISDN audio and video connection between said caller and said called party using said second logical bearer channel of said loop while said initial audio connection is still maintained active;

means for switching audio signals from said initial audio connection of said first logical bearer channel to said ISDN audio and video connection of said second logical bearer channel such that a graceful transition of said audio signals from said first logical bearer channel to said second logical bear is achieved in a manner that is transparent to users; and means for tearing down said initial audio connection.

9. The system of claim 8, wherein said establishing means of said ISDN audio and video connection further includes:

means for transmitting call setup messages by one ISDN video phone to the other ISDN video phone, wherein said call setup messages include information related to communication protocol signals, synchronization frames, and allocation of bandwidth for audio and video signals of said ISDN audio and video connection.

10. The system of claim 8 further comprising:

means for setting up a new ISDN audio and video connection that uses the bandwidth capacity freed by the tearing down of said first logical bearer channel of said initial audio connection; and means for multiplexing and demultiplexing enhanced audio and video signals over a multiconnection structure comprised of a) said ISDN audio and video connection of said second logical bearer channel, and b) said new ISDN audio and video connection which reuses said first logical bearer channel.

11. In a communication switching system for converting a voice grade audio call between two parties having ISDN video phones, to an ISDN multimedia call connecting said ISDN video phones, each one served by an ISDN subscriber loop having a first logical bearer channel, a second logical bearer channel and a logical signaling channel, wherein said system comprises:

means for transmitting call setup messages via said signaling channel of said ISDN subscriber loop to establish said ISDN multimedia call over said second logical bearer channel while maintaining said voice grade call occupying said first logical bearer channel;

means for exchanging synchronization signals between said video phones via said second logical bearer channel of said subscriber loop to allocate bandwidth for the audio and video signals of said ISDN multimedia call;

means for switching audio signals from said first logical bearer channel to said second logical bearer channel for said ISDN multimedia call, such that a graceful transition from the voice grade audio call to the ISDN multimedia call is achieved in a manner that is transparent to users and means for tearing down said voice grade call.

12. The system of claim 11, wherein said transmitting means further includes means for activating in one of said video phones a mechanism that is linked to a processor included in said video phones having a memory arranged to store i) telephone numbers received for incoming calls, and ii) telephone numbers dialed for outgoing calls.

13. The system of claim 12, wherein said activating means further includes:

means for retrieving from said memory the last received telephone number stored in said memory when said voice grade call was received by one of said video phones; and means for dialing said retrieved number.

14. The system of claim 12, wherein said activating of said mechanism means further includes:

means for retrieving from said memory the last dialed telephone number storm in said memory when said voice grade call was initiated by one of said video phones; and means for dialing said retrieved number.

15. Apparatus for use in an ISDN video phone for converting a voice grade audio call to an ISDN multimedia call, said video phone being connected to an ISDN subscriber loop comprised of two logical bearer channels and a signaling channel comprising:

a processor which generates, transmits, and receives a) call set up messages to initiate said multimedia call, and b) handshake protocol and synchronization signals to establish a communication path over a logical bearer channel different from the logical channel being used by said voice grade call;

means included in said processor for storing telephone numbers dialed for an outgoing calls and telephone numbers received for incoming calls;

means for triggering said processor to initiate said multimedia call by generating said call setup messages including one of either the last stored dialed telephone number or the last stored received number;

a matrix switch controlled by said processor which switches incoming and outgoing audio signals from said logical channel used for said voice grade call to said communication path.

* * * * *